United States Patent
Frederiksen et al.

(10) Patent No.: US 7,817,667 B2
(45) Date of Patent: Oct. 19, 2010

(54) METHOD, APPARATUS AND COMPUTER PROGRAM TO DYNAMICALLY ADJUST SEGMENTATION AT A PROTOCOL LAYER, SUCH AS AT THE MEDIUM ACCESS CONTROL (MAC) LAYER

(75) Inventors: Frank Frederiksen, Klarup (DK); Preben Mogensen, Gistrup (DK); Jussi Kahtava, Tokyo (JP); Mika P. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 971 days.

(21) Appl. No.: 11/412,599

(22) Filed: Apr. 26, 2006

(65) Prior Publication Data

US 2006/0245452 A1 Nov. 2, 2006

Related U.S. Application Data

(60) Provisional application No. 60/676,246, filed on Apr. 29, 2005.

(51) Int. Cl.
*H04J 3/24* (2006.01)
(52) U.S. Cl. .................. 370/474; 370/229
(58) Field of Classification Search ......... 370/229–236, 370/470–476
See application file for complete search history.

(56) References Cited

U.S. PATENT DOCUMENTS

2001/0015956 A1  8/2001  Ono ..................... 370/229
2002/0065093 A1* 5/2002  Yi et al. ................ 455/517
2002/0186675 A1* 12/2002 Otting et al. ............ 370/337
2003/0152058 A1* 8/2003  Cimini et al. ........... 370/338
2004/0120300 A1* 6/2004  Saquib .................. 370/342
2004/0141525 A1* 7/2004  Bhushan et al. ......... 370/473
2004/0254779 A1* 12/2004 Wang et al. .............. 703/27
2005/0047346 A1* 3/2005  Terry et al. ............ 370/236
2005/0089084 A1  4/2005  Mahany ................. 375/130
2006/0056443 A1* 3/2006  Tao et al. ............... 370/462
2006/0153232 A1* 7/2006  Shvodian ................ 370/468
2007/0087782 A1* 4/2007  Pen ...................... 455/557

FOREIGN PATENT DOCUMENTS

EP  1341336 A1  9/2003

OTHER PUBLICATIONS

Kwan et al., "Analysis of the Adaptive Modulation and Coding Algorithm with the Multicode Transmission" Sep. 24-28, 2002, 2002 IEEE 56th Vehicular Technology Conference, VTC 2002-Fall. Proceedings, vol. 4, pp. 2007-2011.

* cited by examiner

*Primary Examiner*—Ricky Ngo
*Assistant Examiner*—Gary Mui
(74) *Attorney, Agent, or Firm*—Harrington & Smith

(57) ABSTRACT

In one exemplary aspect thereof the invention provides a method that operates to receive information through at least one input of a protocol layer packet segmentation unit and to dynamically vary packet segment size in accordance with the received information prior to transmission to a receiver. The information received through the at least one input may include information related to channel quality for a channel through which packet data are transmitted to the receiver. The information received through the at least one input may also be or may include information received from at least one of a higher protocol layer or a lower protocol layer.

53 Claims, 3 Drawing Sheets

METHOD, APPARATUS AND COMPUTER PROGRAM TO DYNAMICALLY ADJUST SEGMENTATION AT A PROTOCOL LAYER, SUCH AS AT THE MEDIUM ACCESS CONTROL (MAC) LAYER

CLAIM OF PRIORITY FROM COPENDING PROVISIONAL PATENT APPLICATION

This patent application claims priority under 35 U.S.C. §119(e) from Provisional Patent Application No.: 60/676,246, filed Apr. 29, 2005, the disclosure of which is incorporated by reference herein in its entirety.

TECHNICAL FIELD

The exemplary embodiments of this invention relate generally to wireless communications networks, systems, methods and computer programs and, more specifically, relate to wireless digital communications systems that transmit packet-based data from a sender to a receiver.

BACKGROUND

In a packet-based wireless communications system the system receives packets from an upper layer (for example, from an Internet Protocol (IP) layer). These packets need then be transmitted over a wireless (e.g., cellular mobile) channel, which may offer different and time varying instantaneous data rates to a specific user. Possible reasons for the variations in the data rate may include: different quality of service (QoS) requirements, different instantaneous channel conditions, and also previously sustained data rates. However, an important point to consider is that data packets received from the upper layer(s) should be split (or partitioned or segmented) into smaller data units so as to fit into the instantaneous data capacity on the physical channel. For this to occur, the packets are segmented such that the smallest segment size fits into the lowest resolution provided by the physical layer. An important reason for the presence of the segmentation is that by requiring the segments to have a fixed size, there exists a well-defined interface between the Medium Access Control (MAC) layer and the Physical layer.

However, the inventors have realized that the conventional static segmentation size places limitations and additional requirements on the control signaling for the MAC layer, and may also reduce the scheduling and link adaptation flexibility at the physical layer.

SUMMARY OF THE EXEMPLARY EMBODIMENTS OF THIS INVENTION

The foregoing and other problems are overcome, and other advantages are realized, in accordance with the exemplary embodiments of this invention.

In accordance with the exemplary embodiments of this invention there is provided a method for receiving information through at least one input coupled to a protocol layer packet segmentation unit and for dynamically varying packet segment size in accordance with the received information prior to transmission to a receiver.

Further in accordance with the exemplary embodiments of this invention there is provided a computer program product that comprises a computer useable medium including a computer readable program, where the computer readable program when executed on the computer causes the computer to perform operations that include receiving information through at least one input coupled to a protocol layer packet segmentation unit and dynamically varying packet segment size in accordance with the received information prior to transmission to a receiver.

Further in accordance with the exemplary embodiments of this invention there is provided a device having a first protocol layer outputting packet data; a second protocol layer coupled to the first protocol layer and comprising a packet data scheduling unit and a packet data segmentation unit having at least one input for receiving information; and a third protocol layer coupled to the second protocol layer for sending segmented packet data towards a receiver. The packet segmentation unit operates to dynamically vary packet segment size, in accordance with the received information, prior to transmission to the receiver.

Further still in accordance with the exemplary embodiments of this invention there is provided a wireless communication system node, such as a base station or a user equipment, that includes a transmitter for transmitting packet data to a receiver and at least one data processor coupled to the transmitter and operating under control of a stored program for implementing a Radio Link Layer outputting packet data, a Medium Access Control layer coupled to the Radio Link Layer and comprising means for segmenting packet data, and a Physical layer coupled to the Medium Access Control layer for sending segmented packet data to the receiver via said transmitter. The Medium Access Control layer comprises means for dynamically varying a size of packet data segments output to the Physical layer in accordance with at least one of information received from the Radio Link Layer, information received from the Physical layer, and information available within the Medium Access Control layer.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

The exemplary embodiments of this invention relate to a segmentation of packet data between two protocol layers that are capable of supporting different size data packets. One non-limiting example is L1 and L2 as in the Universal Terrestrial Radio Access Network-Long Term Evolution (UTRAN-LTE) cellular communication system, sometimes referred to as the "3.9G" system.

It is noted that while the ensuing description is made primarily using an example of the packet segmentation unit being disposed in the Medium Access Control (MAC) protocol layer, in other embodiments the packet segmentation unit may be disposed in a different protocol layer, such as in the Radio Link Control (RLC) or Radio Network Layer (RNL), or possibly even in the PHY layer. However, in all of these possible embodiments it is a feature of the exemplary embodiments of the invention that the segment size may be varied according to dynamically changing, possibly short-term requirements such as, but not limited to, varying throughput/data rates.

Figure 1:
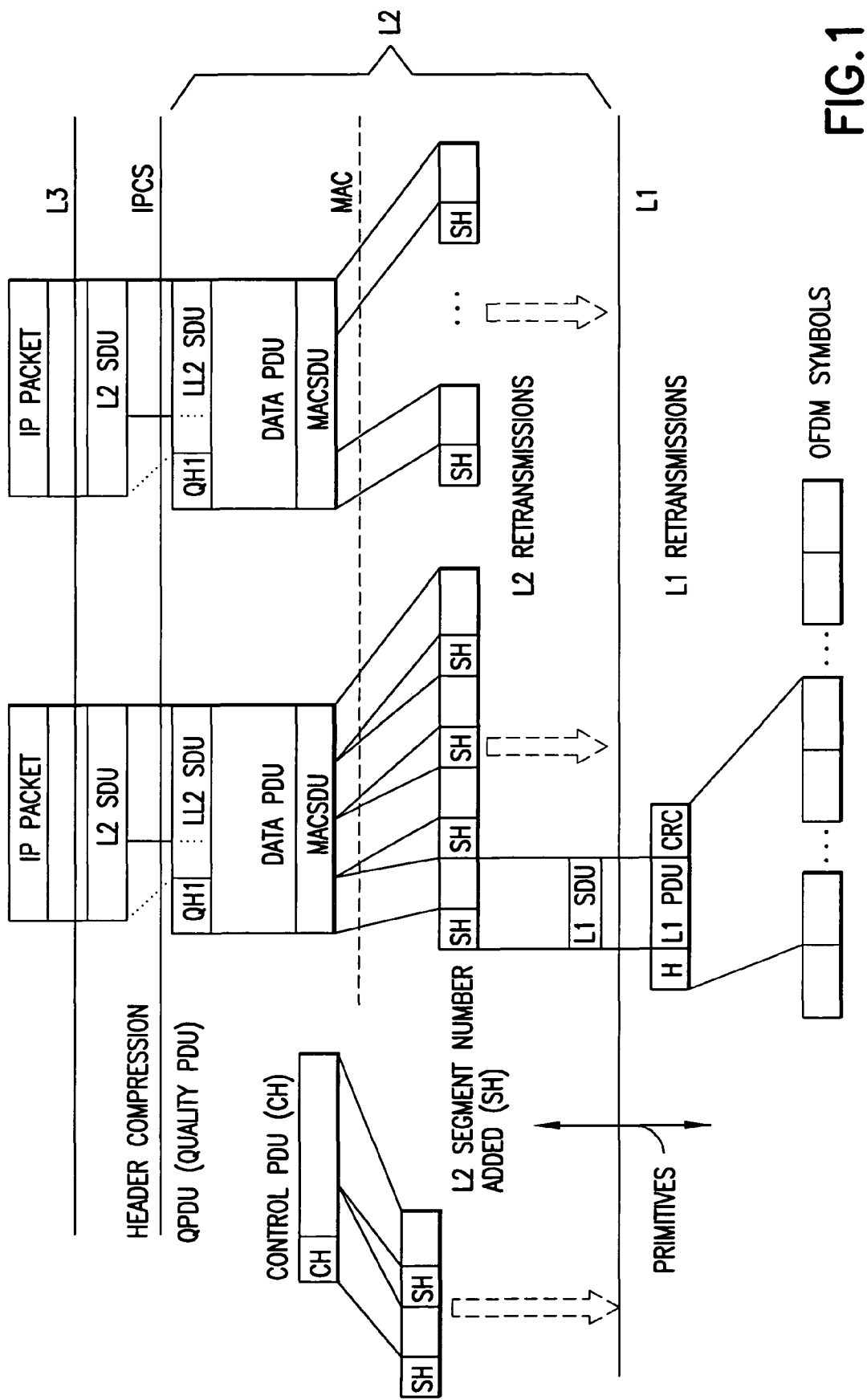
FIG. 1 is a diagram that illustrates segmentation of packets at the MAC layer.

FIG. 1 shows the segmentation of data packets (e.g., Internet Protocol (IP) packets) in the MAC layer, where PDU stands for Protocol Data Unit, L3 is Layer 3 (Radio Network Layer (RNL)), L2 is the MAC layer, L1 is Layer 1 (Physical (PHY) Layer), SDU is a Service Data Unit, PDU is a Protocol Data Unit, H is a Header, CRC is Cyclic Redundancy Check and OFDM symbols are Orthogonal Frequency Division Multiplex symbols. Note that the L2 segment numbers are added to the SH (Service Headers) when forming the L1 SDU. The "primitives" shown in FIG. 1 represent an ability of L1 to inform L2 of the segment size that is available, so that MAC segmentation is performed accordingly (roughly). L1 may further fit the segments received from L2 to payload allocations by rate matching techniques.

In general, a small segment size provides large scheduling and link adaptation flexibility, even for low data rates. However, for high instantaneous data rates many segments need to be transmitted, and thus a segmentation ID number needs to be able to express relatively high resolution, resulting in larger communications overhead (at least for the reason that more bits need to be sent to express the segmentation ID).

In general, a large segment size provides low scheduling and link adaptation flexibility for low data rates. However, for high instantaneous data rates some segments need to be transmitted, but as the segments are relatively large, the segmentation ID number resolution can potentially be relatively low, resulting in reduced overhead.

In either case, if the segmentation size is maintained at a constant value it becomes difficult to achieve the best or near optimum value for the segmentation size. The exemplary embodiments of this invention provide a technique to adaptively adjust the segmentation size such that a best compromise between link adaptation flexibility and overhead is achieved. The exemplary embodiments of this invention may use only L2 information. By providing lower resolution when possible, the signaling can be reduced accordingly, and the number of required signaling bits can be reduced.

Figure 2:
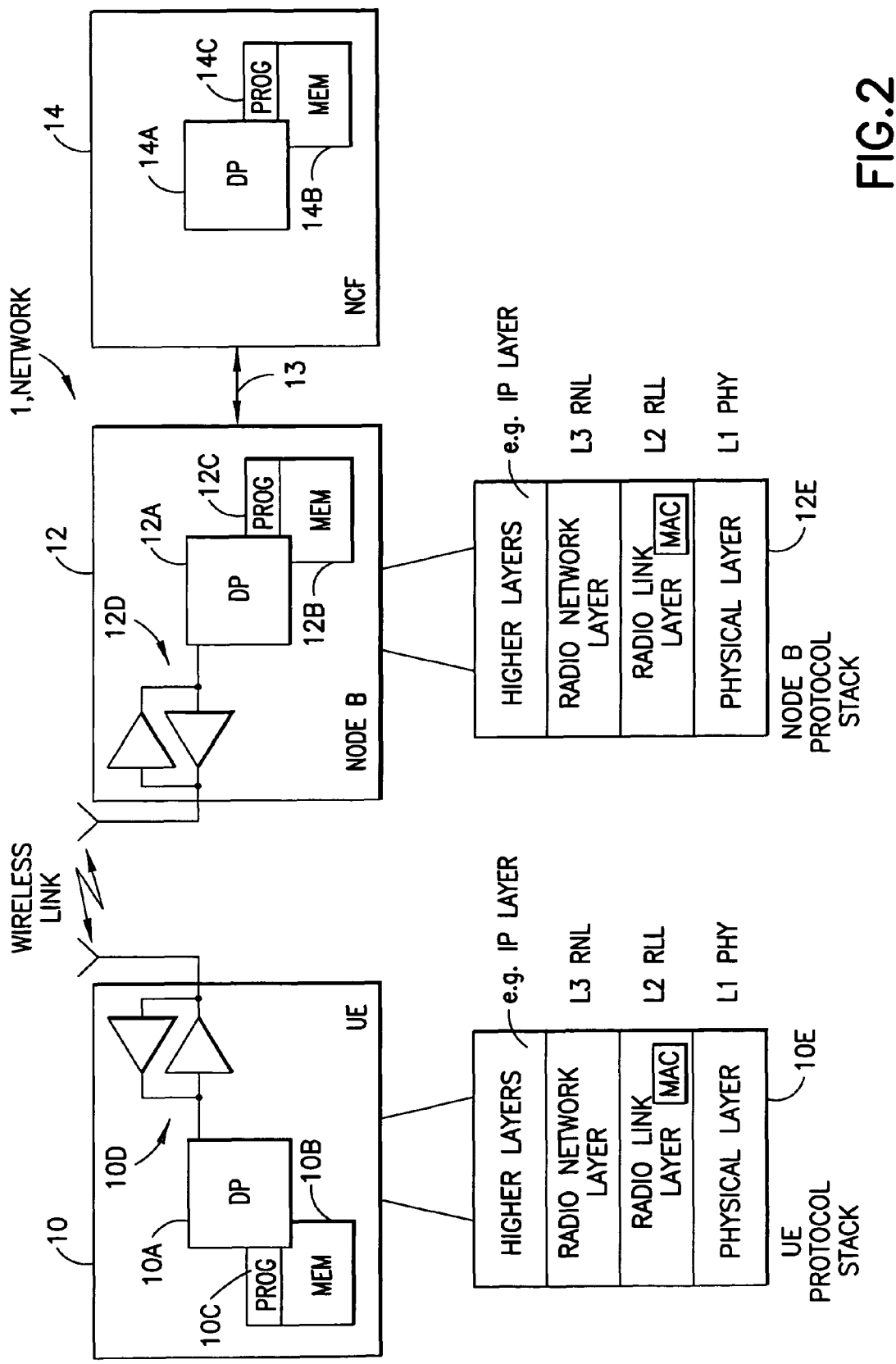
FIG. 2 is a simplified block diagram of a wireless communications system that operates in accordance with the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with a UE 10 via a Node B (also referred to as a base station) 12. The network 1 may include at least one network control function (NCF) 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCF 14 that also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

The UE 10 is assumed to include and implement a protocol stack 10E containing at least layers L1 (PHY, Physical), L2 (RLL, Radio Link Layer, containing the MAC functionality) and L3 (RNL, Radio Network Layer), and typically higher layers as well (e.g., an IP layer). The Node B 12 is assumed to include and implement a protocol stack 12E also containing at least layers L1 (PHY), L2 (RLL) and L3 (RNL), and typically also the higher layers as well (e.g., an IP layer).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 12A of the Node B, and/or by the DP 10A of the UE 10, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 3:
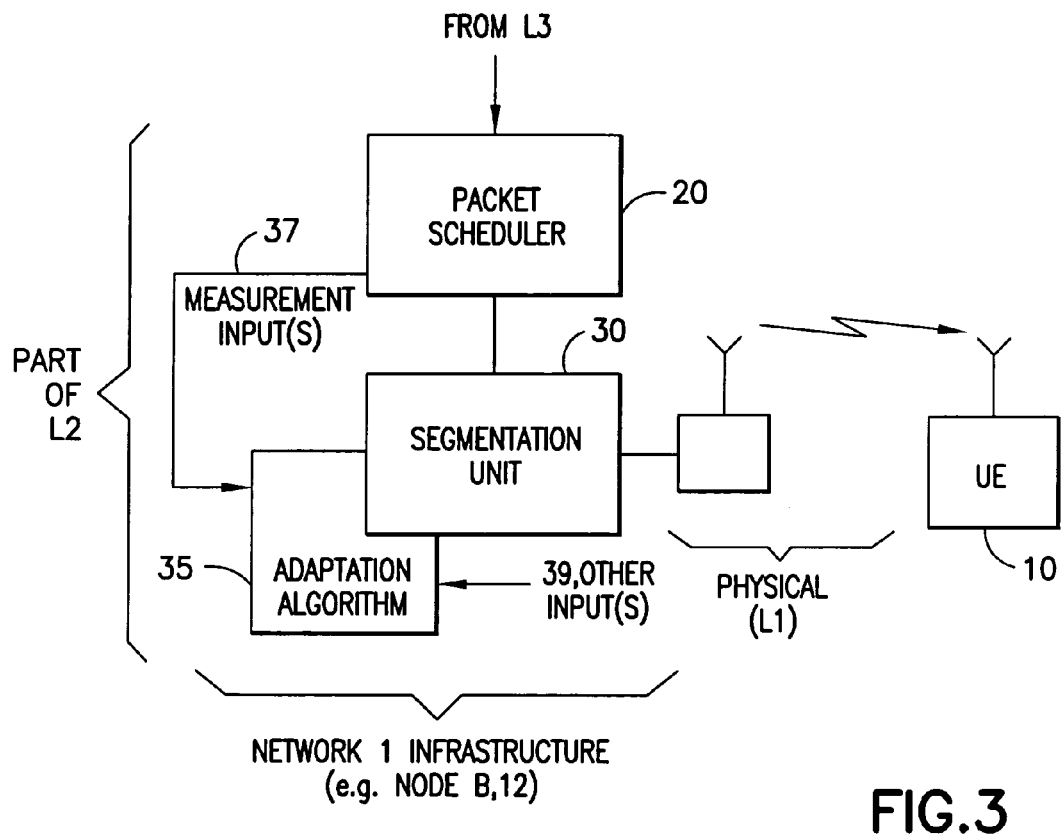
FIG. 3 is a simplified block diagram of a portion of the wireless communications system shown in FIG. 2, and that illustrates in further detail a packet segmentation unit, an adaptation algorithm logical block, and a packet scheduler that cooperate in accordance with the exemplary embodiments of this invention.

Reference is now made to FIG. 3, which illustrates in greater detail a portion of the Node B 12 of FIG. 2. Based on a number of segments scheduled for a single mobile terminal (MT), or more generally for the UE 10, a network packet scheduler (PS) 20, that is coupled to a segmentation unit (SU) 30 that operates in accordance with an adaptation algorithm 35, also referred to as a segmentation control unit that is an aspect of the exemplary embodiments of this invention, analyzes overhead and link adaptation flexibility, and adjusts (dynamically) the packet segmentation size to achieve a currently "best" segmentation unit operating point.

The principles of operation of the adaptation algorithm 25 are now illustrated by way of an example.

Assuming the case of a single user (UE 10), assume further that the segmentation size for the user is 16 bytes, and the maximum number of segments that can be used in the total system is 4096 segments (i.e., segment header size=12 bits). Due to different Hybrid Automatic Retransmission Request (H-ARQ) channels and delays, this transforms into a maximum value of approximately 64 segments within a single Transmit Time Interval (TTI).

Assume now that the UE 10 is experiencing good channel conditions such that the maximum value of 64 segments would almost always be used. In this case the adaptive algorithm 35 detects through one or more inputs (referred to as "measurement input(s)" 37 in FIG. 3), the existence of the good channel conditions and adjusts the segmentation size such that the segmentation size is increased by some factor, such as by a factor of at least two. A non-limiting example of an input that the adaptation algorithm 35 may consider is a number of packets scheduled for the UE 10, as it may be assumed that the PS 20 will schedule more packets for the UE 10 during good channel conditions.

If, on the other hand, the UE 10 is experiencing poor channel conditions, the PS 20 may be assumed to schedule only a few packets at a time. In this case the adaptation algorithm 35 also detects the occurrence of the poor channel conditions and preferably modifies the segmentation size accordingly, such that it is decreased by some factor, such as again by a factor of two.

Assuming as a non-limiting example that the segmentation step resolution is based on powers of 2, the segmentation size modifications are potentially signaled in a simple way (e.g., simply as an exponent). However, the actual resolution (and thereby the resulting segment sizes) that is in use is not particularly germane to an understanding of the exemplary embodiments of this invention.

It can be noted that the segment resolution, if a factor of two, is advantageous in that an increase in the segment size decreases the number of bits in the header by a single bit. However, it may also be a factor of four, implying that the header size is changed by two bits when the segment size is changed by one step size increment.

Figure 4:
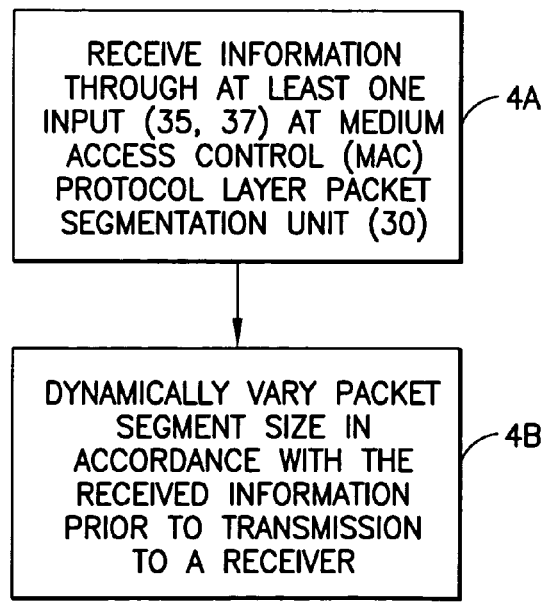
FIG. 4 is a logic flow diagram that is illustrative of the operation of a method in accordance with the exemplary embodiments of this invention.

Reference is made to FIG. 4 for showing a logic flow diagram that is illustrative of the operation of a method in accordance with the exemplary embodiments of this invention. At Block 4A there is an operation of receiving information through at least one input at the MAC protocol layer packet segmentation unit 30, such as at the adaptation algorithm 35, and at Block 4B there is an operation of dynamically varying packet segment size in accordance with the received information prior to transmission to a receiver. It can be appreciated that FIG. 4 is also illustrative of the operations performed by a computer program product executed by, for example the DP 12A or the DP 10A of FIG. 2.

One non-limiting advantage that is realized by the use of the exemplary embodiments of this invention is that the adaptation algorithm 35 attempts to adjust in substantially real time (dynamically) the parameters for the packet segmentation in order to achieve near optimum performance. Furthermore, the measurement input(s) 37 to the adaptation algorithm 35 may be those that are pre-existing at the MAC (L2) layer, and thus may be used by the adaptation algorithm 35 without modification. In addition, other optional "other inputs" 39 shown in FIG. 3 may be employed alone, or in combination with the measurement inputs 37, as noted below.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims.

As but some examples, the use of other similar or equivalent segment sizes and segment step sizes may be attempted by those skilled in the art. Further, the use of the exemplary embodiments of this invention may be applied to single link configurations, as well as globally on a cell basis. In addition, other criteria may be considered by the adaptation algorithm 35, such as the occurrence of and/or frequency of re-transmissions (which may also be assumed to be indicative of channel quality between the transmitter and the receiver (e.g., channel quality between the Node B12 and the UE 10)). This information may form part of the optional "other inputs" 39 shown in FIG. 3. Further, although described in the context of the PS 20, the SU 30 and the adaptation algorithm 35 being located in the wireless network infrastructure, such as in the Node B, it is within the scope of this invention to adapt these teachings for use in the UE 10 as well when transmitting packets to the network infrastructure. For the uplink, the base station may execute a similar algorithm (depending on where it is decided to place the decision-making capability). Thus, both options are available. However, all such and similar modifications of the exemplary embodiments of this invention will still fall within the scope of this invention.

In some embodiments the channel quality may be estimated by the UE 10 and signaled to the Node B12, where it may be used to determine the number of bits/segments to transmit.

Still further, it should be appreciated that the segment size adaptation performed by the adaptation algorithm 35 may take into account the segment sizes of L3. This may be based on, as non-limiting examples, a Maximum Segment Size defined per IP flow, or on an actual observation of segment sizes in a transmission buffer. This information may form part of the optional "other inputs" 39 shown in FIG. 3.

The segmentation may also be adapted so as to carry relatively small segments, such as TCP acknowledgments and VoIP packets, without any segmentation taking place. That is, if a certain packet has a size less than a certain threshold size, which may be variable as a function of a currently used segment size, then the packet can be passed to L1 without segmentation.

The exemplary embodiments of this invention are also applicable to a capability of L1 to channel code and rate match the selected L2 segment size to the physical layer payload. The exemplary embodiments of this invention thus also provide for the segment size adaptation performed by the adaptation algorithm 35 to take into account, at least partially, the guidance of L1 for achieving optimal segment sizes. This information may also form part of the optional "other inputs" 39 shown in FIG. 3.

The exemplary embodiments of this invention also provide for the segment size adaptation performed by the adaptation algorithm 35 to take into account the guidance of the packet scheduler 20 for achieving optimal segment sizes. Such guidance may be based on, as non-limiting examples, traffic volume, throughput, fairness and delay measures of the packet scheduler 20.

Furthermore, some of the features of the exemplary embodiments of this invention may be used to advantage without the corresponding use of other features. As such, the foregoing description should be considered as merely illustrative of the principles, teachings, examples and embodiments of this invention, and not in limitation thereof.

What is claimed is:

1. A method, comprising:
receiving information through at least one input at a medium access control protocol layer for a packet segmentation unit; and
dynamically varying packet segment size in accordance with the received information and physical layer payload and in accordance with data received by the medium access control protocol layer from a lower layer prior to transmission, via cellular communications, to a receiver.

2. The method of claim 1, where the information received through the at least one input is comprised of information related to channel quality for a channel through which packet data are transmitted to the receiver.

3. The method of claim 2, where the channel quality information is derived from at least a number of data packets scheduled for transmission to the receiver.

4. The method of claim 2, where the channel quality information is derived from at least an occurrence of re-transmissions of packet data.

5. The method of claim 2, where the channel quality information is derived from at least a frequency of re-transmissions of packet data.

6. The method of claim 1, where the information received through the at least one input is comprised of information received from a higher protocol layer.

7. The method of claim 6, where the information received from the higher protocol layer is comprised of information descriptive of a segment size used by the higher protocol layer.

8. The method of claim 6, where the information received from the higher protocol layer is comprised of information descriptive of a maximum segment size defined per internet protocol flow.

9. The method of claim 6, where the information received from the higher protocol layer is comprised of information descriptive of packet segment sizes in a transmission buffer.

10. The method of claim 1, where the information received through the at least one input is comprised of information received from a lower protocol layer.

11. The method of claim 1, where dynamically varying packet segment size varies the segment size by a predetermined amount.

12. The method of claim 1, where for a packet size below a threshold packet size, the packet is passed to a lower protocol layer without being segmented.

13. The method of claim 1, where the receiver is comprised of user equipment.

14. The method of claim 1, where the receiver is comprised of a base station.

15. The method of claim 1, further comprising signaling a currently selected packet segment size to the receiver.

16. The method of claim 1, further comprising performing an analysis of overhead and link adaptation flexibility and using the performed analysis when dynamically varying the packet segment size.

17. The method of claim 1, wherein the packet segment size is dynamically varied by a predetermined factor.

18. A non-transitory computer program product comprising a computer useable medium including a computer readable program, wherein the computer readable program when executed on the computer causes the computer to perform operations comprising:
receiving information through at least one input at a medium access control protocol layer for a packet segmentation unit; and
dynamically varying packet segment size in accordance with the received information and physical layer payload and in accordance with data received by the medium access control protocol layer from a lower layer prior to transmission, via cellular communications, to a receiver.

19. The computer program product of claim 18, where the information received through the at least one input is comprised of information related to channel quality for a channel through which packet data are transmitted to the receiver.

20. The computer program product of claim 19, where the channel quality information is derived from at least one of a number of data packets scheduled for transmission to the receiver, an occurrence of re-transmissions of packet data, and a frequency of re-transmissions of packet data.

21. The computer program product of claim 18, where the information received through the at least one input is comprised of information received from a higher protocol layer.

22. The computer program product of claim 21, where the information received from the higher protocol layer is comprised of information that is at least one of descriptive of a segment size used by the higher protocol layer, descriptive of a maximum segment size defined per internet protocol flow, and descriptive of packet segment sizes in a transmission buffer.

23. The computer program product of claim 18, where the information received through the at least one input is comprised of information received from a lower protocol layer.

24. The computer program product of claim 18, where the operation of dynamically varying packet segment size varies the segment size by a predetermined amount.

25. The computer program product of claim 18, where for a packet size below a threshold packet size, the packet is passed to a lower protocol layer without being segmented.

26. The computer program product of claim 18, further comprising performing an analysis of overhead and link adaptation flexibility and using the performed analysis when dynamically varying the packet segment size.

27. The computer program product of claim 18, wherein the packet segment size is dynamically varied by a predetermined factor.

28. A device, comprising:
a first protocol layer outputting packet data;
a second protocol layer configured to communicate with the first protocol layer and comprising a packet data scheduling unit and a packet data segmentation unit having at least one input at a medium access control for receiving information; and
a third protocol layer configured to communicate with the second protocol layer for sending segmented packet data, via cellular communications, towards a receiver; where said packet segmentation unit operates to dynamically vary packet segment size, in accordance with the received information and physical layer payload and in accordance with data received by the second protocol layer from a third protocol layer, prior to transmission to the receiver, wherein the third protocol layer is a lower layer than the second protocol layer.

29. The device of claim 28, where the information received through the at least one input is comprised of information related to channel quality for a channel through which packet data are transmitted to the receiver.

30. The device of claim 29, where the channel quality information is derived from at least a number of data packets scheduled for transmission to the receiver by the packet scheduling unit.

31. The device of claim 29, where the channel quality information is derived from at least an occurrence of re-transmissions of packet data.

32. The device of claim 29, where the channel quality information is derived from at least a frequency of re-transmissions of packet data.

33. The device of claim 28, where the information received through the at least one input is comprised of information received from the first protocol layer.

34. The device of claim 33, where the information received from the first protocol layer is comprised of information descriptive of a segment size used by the first protocol layer.

35. The device of claim 33, where the information received from the first protocol layer is comprised of information descriptive of a maximum segment size defined per internet protocol flow.

36. The device of claim 33, where the information received from the first protocol layer is comprised of information descriptive of packet segment sizes in a transmission buffer.

37. The device of claim 28, where the information received through the at least one input is comprised of information received from the third protocol layer.

38. The device of claim 28, where said segmentation unit dynamically varies packet segment size by a predetermined amount.

39. The device of claim 28, where for a packet size below a threshold packet size, the segmentation unit passes the packet to the third protocol layer without being segmented.

40. The device of claim 28, where the receiver is comprised of user equipment.

41. The device of claim 28, where the receiver is comprised of a base station.

42. The device of claim 28, further comprising signaling a currently selected packet segment size to the receiver.

43. The device of claim 28, where said second protocol layer is comprised of a medium access control protocol layer.

44. The device of claim 28, wherein the packet segment size is dynamically varied by a predetermined factor.

45. A wireless communication system node, comprising:
a transmitter configured to transmit via cellular communications packet data to a receiver; and
at least one data processor configured to communicate with the transmitter and configured to operate under control of a stored program for implementing a radio link layer outputting packet data, a medium access control layer configured to communicate with the radio link layer and comprising means for segmenting packet data, and a physical layer configured to communicate with the medium access control protocol layer for sending segmented packet data to the receiver via said transmitter,
said medium access control layer comprising means for dynamically varying a size of packet data segments output to said physical layer in accordance with physical layer payload and at least one of information received from said radio link layer, information received from said physical layer by the medium access control layer, and information available within said medium access control layer prior to transmission to the receiver.

46. The wireless communication system node of claim 45, where said information is indicative of at least a quality of a channel through which the packet data is transmitted to the receiver.

47. The wireless communication system node of claim 45, embodied in a base station.

48. The wireless communication system node of claim 45, embodied in user equipment.

49. The wireless communication system node of claim 45, where the information available in said medium access control layer is obtained at least in part from means for scheduling packet data for outputting to said physical layer.

50. The wireless communication system node of claim 45, where the physical layer sends the segmented packet data to the receiver as orthogonal frequency division multiplexing symbols.

51. The wireless communication system node of claim 45, wherein the packet segment size is dynamically varied by a predetermined factor.

52. An apparatus comprising:
at least one processor; and
at least one memory including computer code,
wherein the at least one memory including computer code, along with the processor, is configured to perform as follows:
receive information through at least one input at a medium access control protocol layer for a packet segmentation unit; and
dynamically vary packet segment size in accordance with the received information and physical layer and in accordance with data received by the medium access control protocol layer from a lower layer payload prior to transmission, via cellular communications, to a receiver.

53. The apparatus of claim 52, wherein the packet segment size is dynamically varied by a predetermined factor.

* * * * *